United States Patent [19]

Amro et al.

[11] Patent Number: 5,757,370
[45] Date of Patent: May 26, 1998

[54] METHOD, MEMORY, AND APPARATUS FOR EFFECTIVELY LOCATING AN OBJECT WITHIN A COMPOUND DOCUMENT

[75] Inventors: Hatim Yousef Amro, Austin; John Paul Dodson, Pflugerville, both of Tex.

[73] Assignee: International Business Machines Corporation, Armonk, N.Y.

[21] Appl. No.: 703,218

[22] Filed: Aug. 26, 1996

[51] Int. Cl.⁶ .................................................. G06F 3/00
[52] U.S. Cl. ................................................... 345/341
[58] Field of Search ............................. 395/341, 973, 395/350; 364/927.62; 345/123

[56] References Cited

U.S. PATENT DOCUMENTS

| | | | |
|---|---|---|---|
| 5,196,838 | 3/1993 | Meier et al. | 395/341 X |
| 5,263,134 | 11/1993 | Paal et al. | 395/341 X |
| 5,333,247 | 7/1994 | Gest et al. | 395/341 X |
| 5,339,391 | 8/1994 | Wroblewski et al. | 395/341 |
| 5,363,481 | 11/1994 | Tilt | 395/352 |
| 5,398,310 | 3/1995 | Tchao et al. | 395/804 |
| 5,402,152 | 3/1995 | Needham | 345/179 |
| 5,418,549 | 5/1995 | Anderson et al. | 345/145 |
| 5,479,600 | 12/1995 | Wroblewski et al. | 395/340 |
| 5,485,174 | 1/1996 | Henshaw et al. | 345/123 |
| 5,491,781 | 2/1996 | Gasperina | 395/341 |
| 5,506,951 | 4/1996 | Ishikawa | 395/341 |
| 5,557,722 | 9/1996 | DeRose et al. | 395/350 X |
| 5,615,346 | 3/1997 | Geken | 395/341 |

*Primary Examiner*—A. Katbab
*Attorney, Agent, or Firm*—Richard A. Henkler; Andrew J. Dillon

[57] ABSTRACT

A method, memory, and apparatus locate a portion (e.g., page) in a compound document. The method directs a computer, having at least a display device, to locate the specific page in the compound document. Specifically, the method creates an outline for each portion of the compound document, displays a display container (e.g., mini window) in a first position on the display (e.g., at a certain position on the scroll bar), wherein the first position corresponds to a first portion (e.g., page) of the compound document, in response to invoking a command by user controls (e.g., holding down second mouse button), scrolls the display container from the first position to at least a second position on the display, and wherein the second position corresponds to a second portion (e.g., page) of the compound document, and displays the outline of the second portion of the compound document in the display container.

9 Claims, 4 Drawing Sheets

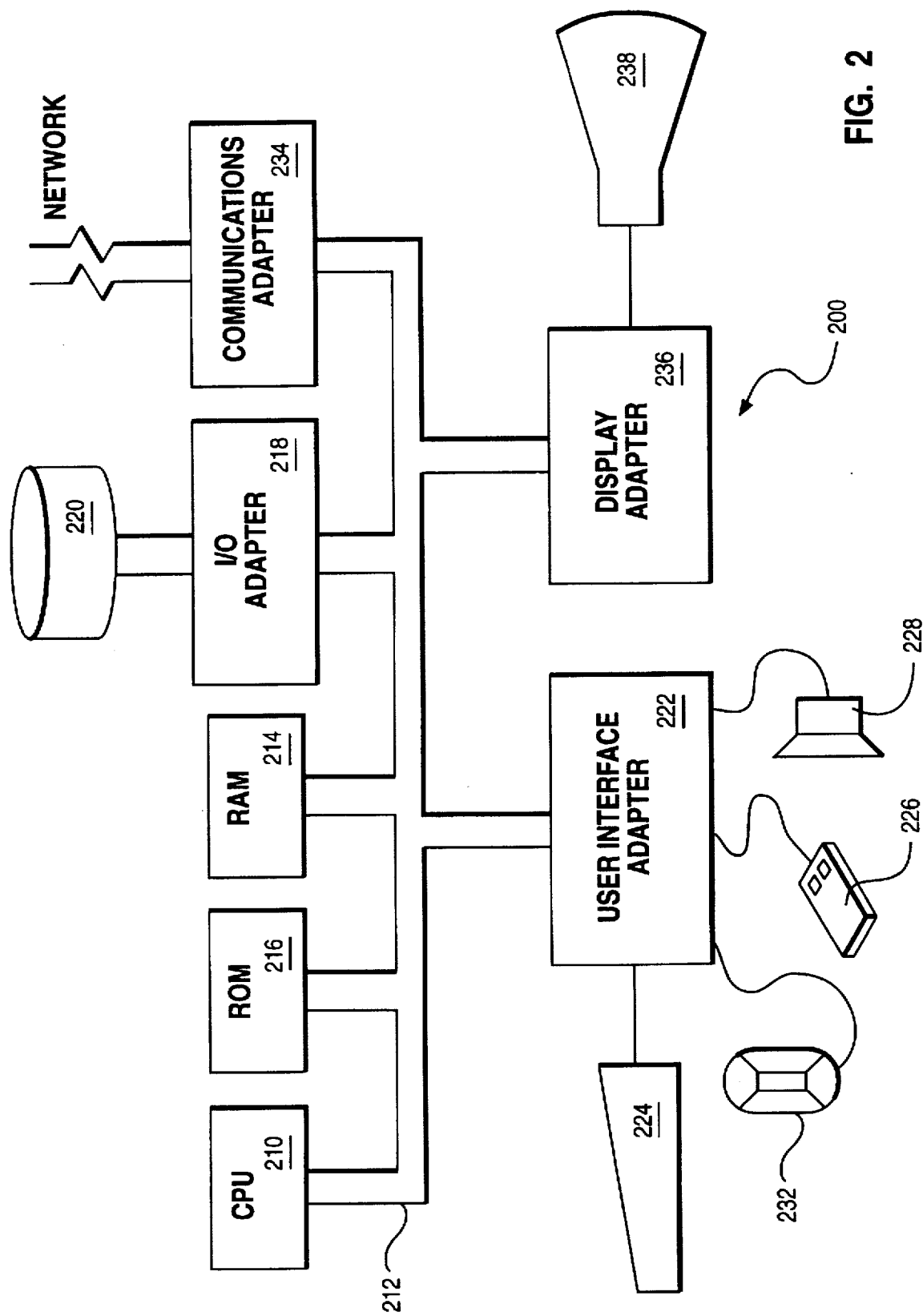

METHOD, MEMORY, AND APPARATUS FOR EFFECTIVELY LOCATING AN OBJECT WITHIN A COMPOUND DOCUMENT

CROSS-REFERENCE TO RELATED APPLICATIONS

The present invention appears to claim subject matter disclosed in prior co-pending application, Ser. No. 08/703,217, IBM Docket No. AT9-96-129, filed on Aug. 26, 1996.

BACKGROUND OF THE INVENTION

1. Field of the Invention

The present invention relates to graphical user interfaces (GUIs) and, more particularly, to a method, memory, and apparatus for locating an object in a compound document.

2. Background Information and Description of the Related Art

FIG. 1 illustrates a pictorial view of window 140 that is controlled by a conventional GUI. Window 140 displays a portion of a compound document. A compound document contains multiple objects capable of running within the document, such as a spreadsheet, text, hotlink, picture, sound, and video object. One skilled in the art of graphical user interfaces readily recognizes that the size and position of elevator 150 within scroll bar 160 corresponds to the size and position of the current viewable page in relation to the compound document. In this example, because the compound document contains too many pages to be simultaneously viewed, the user can position a mouse cursor over arrow sections 110 or 120 of scroll bar 160 and click a pointing device (e.g., mouse) to scroll the document upward or downward, as appropriate.

If, however, the compound document is extremely large, the user may have difficulty finding a desired page within the compound document. Moving elevator 150 up and down to find a specific page can be tedious and time consuming. Therefore, there is great need for a technique that speeds searches through a compound document, especially a large compound document. Such a technique should make the GUI more user friendly and efficient.

SUMMARY

The present invention includes a method, memory, and apparatus for locating a portion (e.g., page) in a compound document. The method includes steps for directing a computer, having at least a display device, to locate the specific page in the compound document. Specifically, the method includes the steps of creating an outline for each portion of the compound document, displaying a display container (e.g., mini window) in a first position on the display (e.g., at a certain position on the scroll bar), wherein the first position corresponds to a first portion (e.g., page) of the compound document, in response to invoking a command by user controls (e.g., holding down second mouse button), scrolling the display container from the first position to at least a second position on the display, and wherein the second position corresponds to a second portion (e.g., page) of the compound document, and displaying the outline of the second portion of the compound document in the display container.

BRIEF DESCRIPTION OF THE DRAWINGS

FIG. 2 illustrates a representative hardware environment in accordance with the present invention.

DETAILED DESCRIPTION OF THE PREFERRED EMBODIMENT

Figure 1:
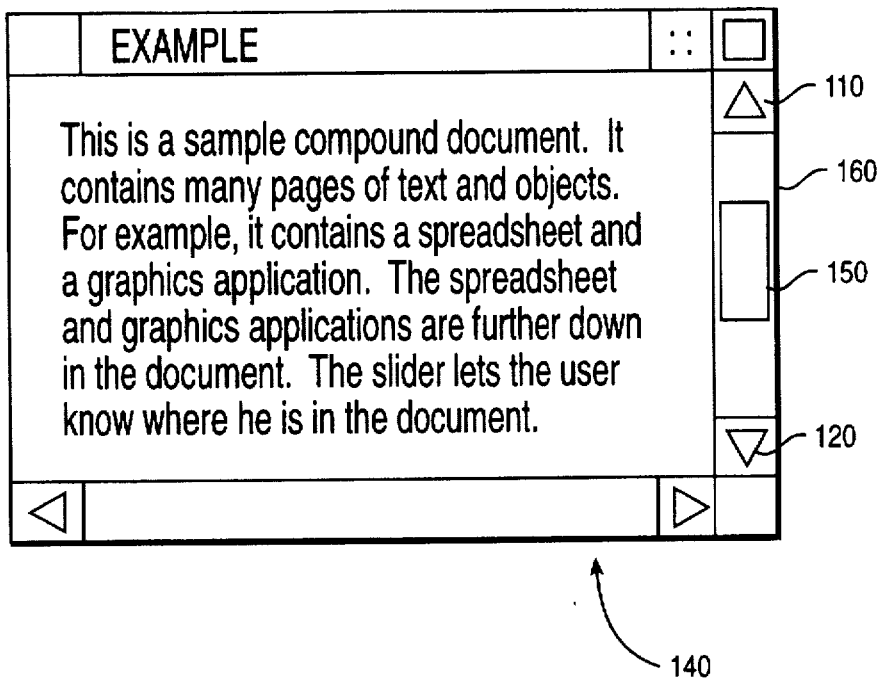
FIG. 1 illustrates a prior art pictorial view of a window having a scroll bar and elevator.

An exemplary embodiment includes an apparatus, memory, and method for efficiently locating one or more pages within a compound document. The exemplary embodiment is preferably practiced in a suitable representative hardware configuration, such as the hardware configuration illustrated in FIG. 2.

Referring to FIG. 2, workstation 200 includes any suitable central processing unit 210, such as a conventional microprocessor, and a number of other units interconnected via system bus 212. Illustratively, workstation 200 includes random access memory ("RAM") 214, read only memory ("ROM") 216, display adapter 236 for connecting system bus 212 to display device 238, and I/O adapter 218 for connecting peripheral devices (e.g. disk and tape drives 220) to system bus 212. Workstation 200 further includes user interface adapter 222 for connecting keyboard 224, mouse 226, speaker 228, microphone 232, and/or other user interface devices, such as a touch screen device (not shown), to system bus 212. Communication adapter 234 connects workstation 200 to a data processing network.

The exemplary embodiment also includes a graphical user interface (e.g. Motif Window Manager) that resides within a machine-readable media to direct the operation of workstation 200. Any suitable machine-readable media may retain the GUI, such as RAM 214, ROM 216, a magnetic diskette, magnetic tape, or optical disk (the last three being located in disk and tape drives 220).

The GUI allows a user to efficiently and effectively locate specific pages within a compound document by directing CPU 210 to generate a scrollable mini window (also referred to as "display container", described herein). However, one skilled in the art will readily recognize that the GUI could utilize other means in place of the mini window to implement the exemplary embodiment. While any suitable operating system and associated GUI (e.g., Microsoft Windows) may direct CPU 210, in the preferred embodiment, the AIX operating system and AIXwindows windowing system (i.e., GUI) direct CPU 210. Similar to most windowing systems, AIXwindows utilizes a conventional mouse and mouse cursor to provide point-and-click management/drag-and-drop manipulation of objects displayed on the display screen. However, other technologies could be used, such as touchscreen technology.

Figure 3:
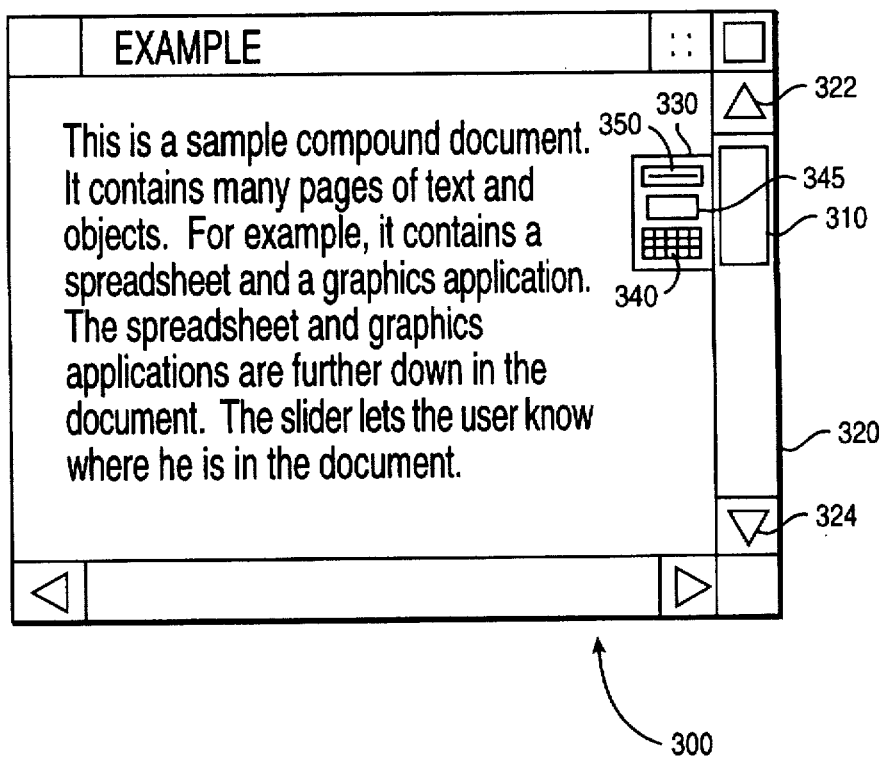
FIG. 3 illustrates a pictorial view of a mini window for displaying an outline of a compound document's page in accordance with the present invention.

FIG. 3 illustrates window 300 for displaying a portion (e.g., one page) of a compound document (e.g., a document having numerous pages and multiple objects capable of executing within those pages). Window 300 includes scroll bar 320, up arrow 322, down arrow 324, and elevator 310. In this example, window 300 displays a page of text from a compound document. The user may activate any suitable pointing device, such as a mouse, over up arrow 322 or down arrow 324 to scroll elevator 310 and, thus, the compound document, up or down, respectively.

The GUI sizes elevator 310 within scroll bar 320 according to the number of pages in the compound document.

Therefore, in the present illustration, the length of elevator 310 is small with respect to the length of scroll bar 320 because it represents one of many pages of the compound document. Similarly, the GUI positions elevator 310 within scroll bar 320 relative to the viewable position of the compound document. For example, the GUI positions elevator 310 at the top of scroll bar 320 when the user is viewing the first page of the compound document, and at the bottom of scroll bar 320 when the user is viewing the last page of the compound document.

When the user presses and holds the right mouse button over elevator 310, the GUI is placed in a "search" mode. When the GUI is in the search mode, the displayed contents of window 300 do not scroll upward or downward in accordance with upward/downward movement of elevator 310. Although the displayed contents do not scroll upward or downward within window 300, the GUI does continue to point to the appropriate page of the compound document residing in RAM corresponding to the position of elevator 310 within scroll bar 320. Moreover, when in the search mode, the GUI displays and moves mini window 330 (e.g., the "display container") upward or downward in accordance with the upward or downward movement of elevator 310 within scroll bar 320. Mini window 330 displays an "outline" (described herein) of the compound document's page corresponding to the position of elevator 310 within scroll bar 320.

Figure 5:
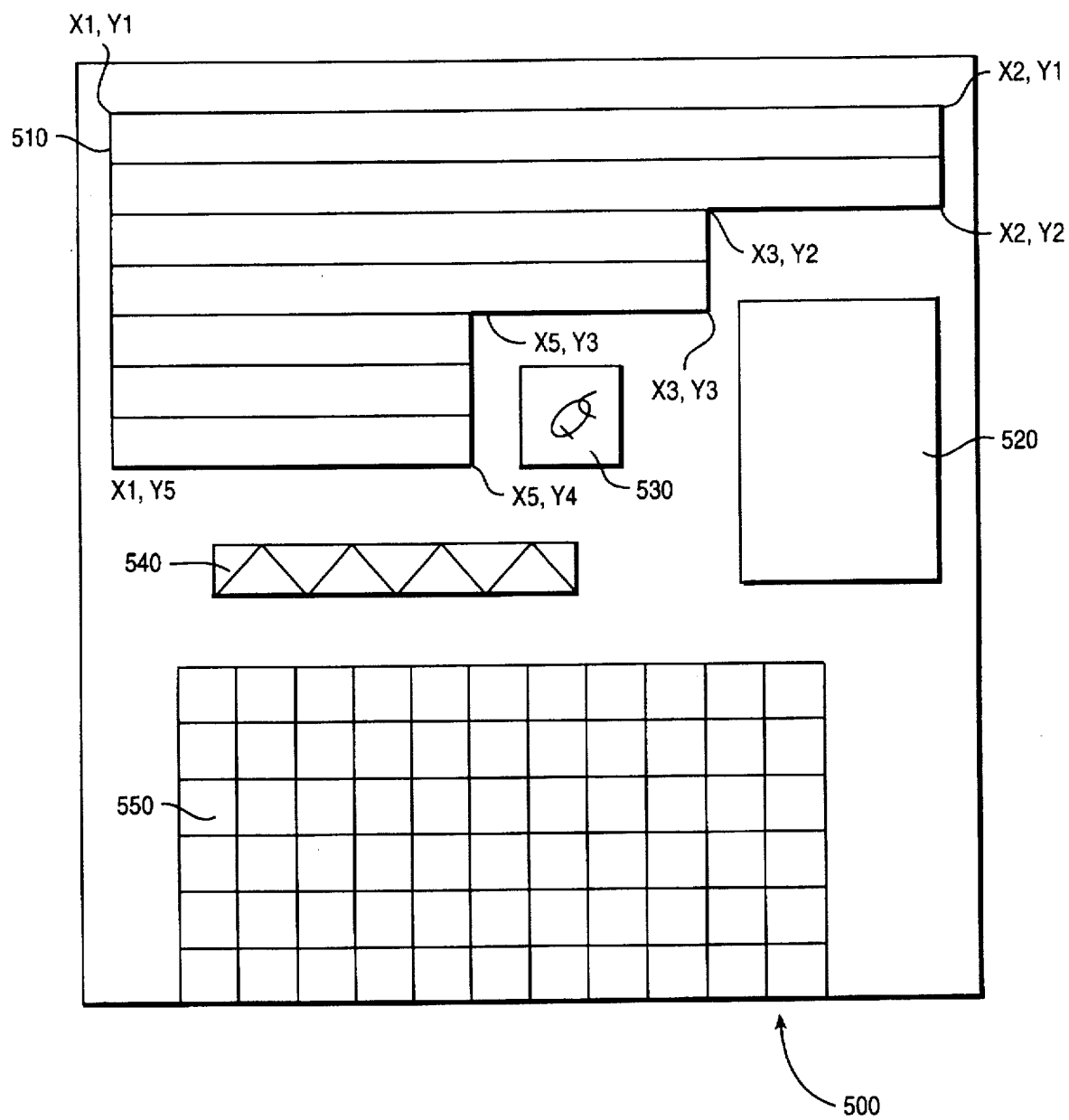
FIG. 5 illustrates an enlarged example of a mini window for displaying an outline of a compound document's page in accordance with the present invention.

FIG. 5 illustrates an enlarged view of mini window 500 that displays an outline of a corresponding page. The outline includes boxes having various symbols therein to indicate the portion of the corresponding page having text, a picture object, spreadsheet object, and so on. The GUI determines the percentage of a page that an object occupies, and then scales that object's representative box in the mini window accordingly. Therefore, if the top 30% of a page contains text, then the top 30% of the mini window will contain a box having lines therein. In this manner, the GUI can create a reduced representation (i.e., outline) of the text and objects within a particular page, and then display that reduced representation in a mini window. However, one skilled in the art recognizes that there are other means for displaying the reduced representations of the pages.

In this example, mini window 500 includes boxes 510, 520, 530, 540, and 550. The horizontal lines within box 510 (also in box 350 of FIG. 3) indicate that text is present within that portion of the corresponding page. Accordingly, the upper portion of the page contains text. The empty space within box 520 (also box 345) indicates that a picture object is present within that portion of the corresponding page. The icon displayed within box 530 indicates that a video object is present within that portion of the corresponding page. The grid within box 550 (and box 340) indicates that a spreadsheet object is present in that portion of the corresponding page. If the GUI does not recognize the object type, the GUI utilizes a generic representation, as shown in box 540. Coordinates X1,Y1,X2,Y1, represent the corners of the box.

Figure 4:
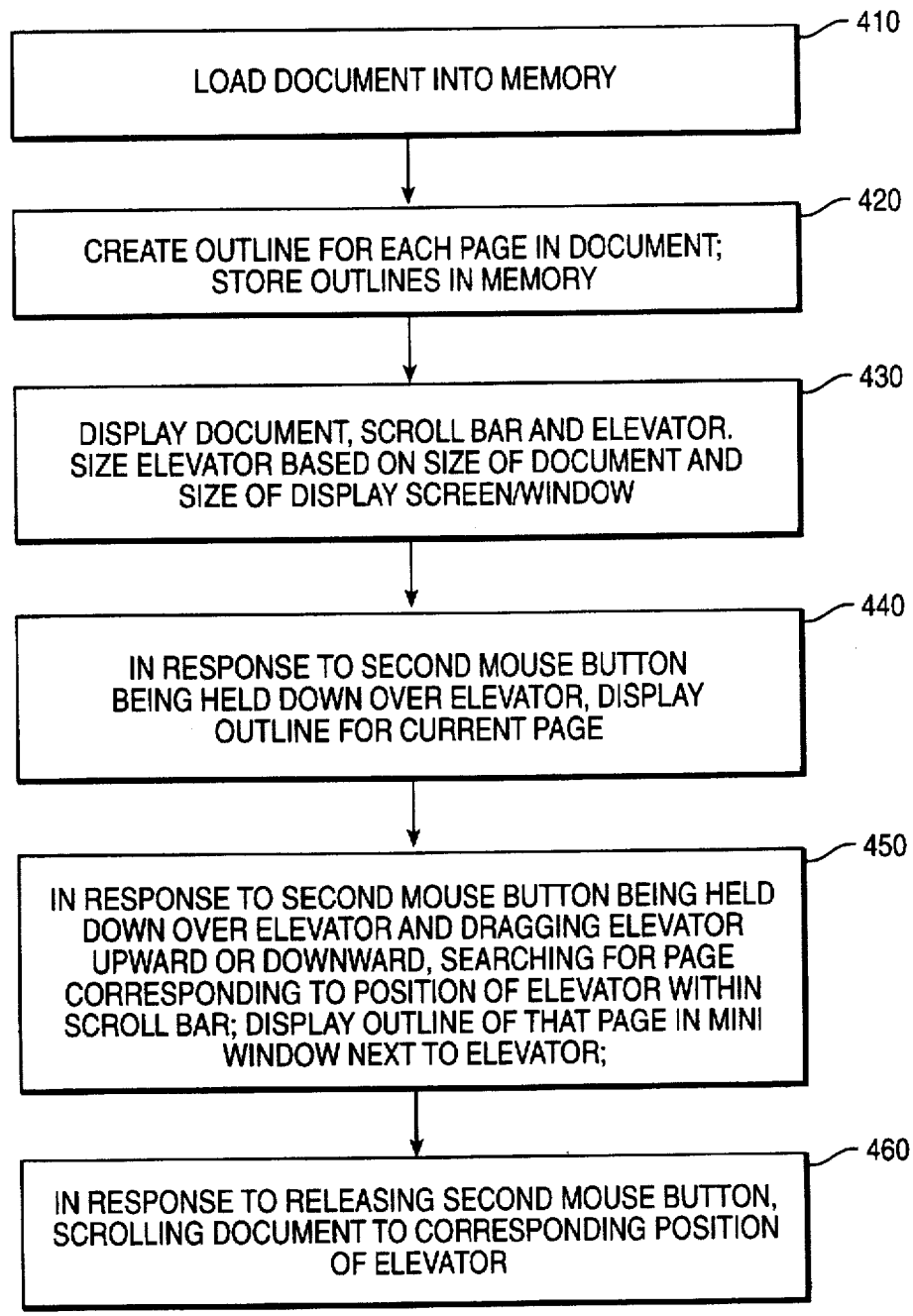
FIG. 4 is a flow chart of the logical flow in accordance with the present invention.

FIG. 4 illustrates detailed logic in the form of a flow diagram describing the operation of the GUI according to the exemplary embodiment. At 410, in response to a user opening a compound document, the GUI loads every page of the compound document from, for example, a hard disk drive, into RAM 214. Once in RAM, at 420, the GUI scans each line of each page for specific indicators (e.g., headers and trailers) designating the beginning and end, respectively, of each text and object section. The syntax of the headers and trailer is based on the internal format used by the operating system. Some commonly used conventional internal formats include RTF (Rich Text Format), PDF format, FrameMaker (MIF format), and HTML (Internet format). For example, an internal format may use a T to represent the header for text and a /T to represent the trailer for text.

While scanning each line of each page for headers and trailers, the GUI creates an outline that defines one or more boxes for each page and stores those outlines in a database table in memory. Table A below illustrates an example of a partial outline for page 1 (see FIG. 5). For line 1 of page 1, "X1,Y1" represents the display screen coordinates of the start of a text section because a "T" follows the coordinates. Also in line 1, the coordinates X2,Y1 represent one corner of the box. For line 5 of page 1, "X5,Y4" represents the display screen coordinates of the end of the text section because a "/T" follows those coordinates. Lines 2 and 3 contain display screen coordinates that represent corners of the box. By designating each corner of the box, the GUI can then connect the corners with a straight line to form the box. Because the box contains text, the GUI will place lines inside the box.

TABLE A

| PAGE 1 | |
|---|---|
| Line 1 | X1, Y1, T; X2, Y1 |
| Line 2 | X3, Y2; X2, Y2 |
| Line 3 | X5, Y3; X4, Y3 |
| Line 4 | |
| Line 5 | X1, Y5; X5, Y4 /T |

At 430, the GUI displays the compound document, scroll bar, and elevator within window 300. The GUI sizes the elevator in accordance with the size of the document. At 440, in response to the user pressing and holding the second mouse button down over the elevator, the GUI displays in a mini window the outline for the page currently represented by the position of the elevator. Additionally, other information could be displayed in the mini window, such as the page number. At 450, in response to the second mouse button continuing to be held down over the elevator and the user dragging the elevator upward or downward, the GUI dynamically searches through RAM for the page corresponding to the position of the elevator within the scroll bar. The GUI then dynamically searches the database table for the information needed to display the outline of the page in the mini window next to the elevator. Therefore, the user can view the box(es) in the mini window to determine what type of object/text resides in that page. At 460, in response to the second mouse button being released, the GUI removes the mini window and scrolls the compound document to the page corresponding to the position of the elevator in the scroll bar.

While the invention has been shown and described with reference to particular embodiments thereof, it will be understood by those skilled in the art that the foregoing and other changes in form and detail may be made therein without departing from the spirit and scope of the invention, which is defined only by the following claims. For example, when the GUI is in the search mode, the elevator could be transformed into the mini window itself. Therefore, the user could move the mini window upward and downward within the scroll bar, and the contents of the mini window would change according to the position of the mini window within the scroll bar.

What is claimed is:

1. A method for directing a computer system, having at least a processor, display, and user controls to locate at least one portion of a compound document, comprising the steps of:

creating an outline for each portion of the compound document;

displaying a display container in a first position on the display, wherein the first position corresponds to a first portion of the compound document;

in response to invoking a command by user controls, scrolling the display container from the first position to at least a second position on the display, and wherein the second position corresponds to a second portion of the compound document; and displaying the outline of the second portion of the compound document in the display container.

2. The method according to claim 1 wherein the step of creating an outline for each portion of the compound document comprises the following steps:

scanning each line of each portion of the compound document for indicators designating a beginning and end of text and object sections;

storing screen coordinates for each indicator into a database table;

defining a box around each text and object section;

storing screen coordinates for each corner of each box in the database table; and storing a unique symbol for text and each type of object into the database table.

3. The method according to claim 2 wherein the step of displaying the outline comprises the step of:

(a) connecting the corners of each box; and (b) displaying the unique symbol in each box corresponding to the type of object or text represented by the box.

4. The method according to claim 1 wherein each portion corresponds to one page of the compound document.

5. An apparatus for directing a computer system, having at least a processor, display, and user controls, to locate at least one portion of a compound document, comprising:

means for creating an outline for each portion of the compound document;

means for displaying a display container in a first position on the display, wherein the first position corresponds to a first portion of the compound document;

in response to invoking a command by user controls, means for scrolling the display container from the first position to at least a second position on the display, wherein the second position corresponds to a second portion of the compound document; and means for displaying the outline of the second portion of the compound document in the display container.

6. The apparatus according to claim 5 further comprising:

means for scanning each line of each portion of the compound document for indicators designating a beginning and end of text and object sections;

means for storing screen coordinates for each indicator into a database table;

means for defining a box around each text and object section;

means for storing screen coordinates for each corner of each box in the database table; and means for storing a unique symbol for text and each type of object into the database table.

7. The apparatus according to claim 6 further comprising:

means for connecting the corners of each box; and means for displaying the unique symbol in each box corresponding to the type of object or text represented by the box.

8. The apparatus according to claim 5 wherein each portion corresponds to one page of the compound document.

9. An article of manufacture, comprising:

a computer usable medium having computer readable program code means for directing a computer system, having at least a processor, display, and user controls to locate at least one portion of a compound document, the computer readable program code means comprising:

computer readable program code means for creating an outline for each portion of the compound document;

computer readable program code means for displaying a display container in a first position on the display, wherein the first position corresponds to a first portion of the compound document;

in response to invoking a command by user controls, computer readable program code product means scrolling the display container from the first position to at least a second position on the display, and wherein the second position corresponds to a second portion of the compound document; and computer readable program code means for displaying the outline of the second portion of the compound document in the display container.

* * * * *